(12) United States Patent
Ogawa et al.

(10) Patent No.: US 11,115,917 B2
(45) Date of Patent: Sep. 7, 2021

(54) DEVICE AND METHOD

(71) Applicant: PANASONIC INTELLECTUAL PROPERTY MANAGEMENT CO., LTD., Osaka (JP)

(72) Inventors: Tomoki Ogawa, Osaka (JP); Mitsuki Yamada, Osaka (JP); Masayuki Kozuka, Osaka (JP); Kunio Gobara, Osaka (JP); Yoshishige Yoshikawa, Osaka (JP); Shinya Nakai, Nara (JP); Junya Suzuki, Kyoto (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 16/638,723

(22) PCT Filed: Feb. 27, 2019

(86) PCT No.: PCT/JP2019/007577
§ 371 (c)(1),
(2) Date: Feb. 12, 2020

(87) PCT Pub. No.: WO2019/172045
PCT Pub. Date: Sep. 12, 2019

(65) Prior Publication Data
US 2020/0187107 A1    Jun. 11, 2020

Related U.S. Application Data

(60) Provisional application No. 62/640,758, filed on Mar. 9, 2018.

(51) Int. Cl.
*G06F 3/0481* (2013.01)
*H04W 48/18* (2009.01)
(Continued)

(52) U.S. Cl.
CPC ............ *H04W 48/18* (2013.01); *H04B 17/23* (2015.01); *H04L 12/282* (2013.01); *H04W 4/70* (2018.02);
(Continued)

(58) Field of Classification Search
CPC ..... H04W 48/18; H04W 76/10; H04W 48/16; H04W 88/06; G06F 3/0481
See application file for complete search history.

(56) References Cited

U.S. PATENT DOCUMENTS 6,035,183 A * 3/2000 Todd .................... H04B 7/0814
455/101
7,245,913 B1 * 7/2007 Nguyen ................ H04W 88/06
455/428

(Continued)

FOREIGN PATENT DOCUMENTS

JP    2006-005772 A    1/2006
JP    2006-074295 A    3/2006
(Continued)

OTHER PUBLICATIONS

International Search Report and Written Opinion dated Apr. 2, 2019 in International Application No. PCT/JP2019/007577; with partial English translation.

(Continued)

*Primary Examiner* — Phenuel S Salomon
(74) *Attorney, Agent, or Firm* — McDermott Will and Emery LLP

(57) ABSTRACT

A device includes: N communication modules, a selector that selects one communication module, an obtainer that obtains a reception strength of a signal, a generator that generates an image that includes 2N display regions associated with the N communication modules in order of communication speed from slower to faster per two display (Continued)

regions counted from a reference position along one direction, and a display. The generator generates, as the image, an image displaying (i) a graphic of a first type in, among the two display regions associated with the one communication module, more display regions counted from proximity to the reference position along the one direction, with an increase in the reception strength of the one communication module, and (ii) the graphic of the first type in each of two display regions associated with a communication module that communicates at a slower speed than the one communication module.

6 Claims, 6 Drawing Sheets

(51) Int. Cl.
*H04B 17/23* (2015.01)
*H04W 76/10* (2018.01)
*H04W 48/16* (2009.01)
*H04W 88/06* (2009.01)
*H04W 4/70* (2018.01)
*H04L 12/28* (2006.01)

(52) U.S. Cl.
CPC .......... *H04W 48/16* (2013.01); *H04W 76/10* (2018.02); *H04W 88/06* (2013.01); *H04L 2012/285* (2013.01); *H04L 2012/2841* (2013.01)

(56) References Cited

U.S. PATENT DOCUMENTS

| | | | | |
|---|---|---|---|---|
| 7,450,958 | B2* | 11/2008 | Shim | H04B 17/23 |
| | | | | 455/115.3 |
| 7,606,543 | B1* | 10/2009 | Seppanen | H04B 17/23 |
| | | | | 455/226.2 |
| 7,660,565 | B2* | 2/2010 | Patel | H04B 17/24 |
| | | | | 370/332 |
| 7,756,485 | B2* | 7/2010 | Paas | H04M 1/72519 |
| | | | | 455/115.3 |
| 2004/0114553 | A1* | 6/2004 | Jiang | H04W 92/02 |
| | | | | 370/328 |
| 2004/0192290 | A1* | 9/2004 | Muthuswamy | H04B 17/309 |
| | | | | 455/425 |
| 2005/0130661 | A1* | 6/2005 | Aerrabotu | H04W 48/08 |
| | | | | 455/437 |
| 2005/0152304 | A1* | 7/2005 | Park | H04W 88/02 |
| | | | | 370/328 |
| 2005/0226178 | A1* | 10/2005 | Forand | H04W 48/16 |
| | | | | 370/328 |
| 2005/0282541 | A1 | 12/2005 | Iizuka et al. | |
| 2006/0121894 | A1* | 6/2006 | Ganesan | H04W 24/08 |
| | | | | 455/432.1 |
| 2007/0010241 | A1* | 1/2007 | Wachter | H04W 24/00 |
| | | | | 455/423 |
| 2007/0016861 | A1* | 1/2007 | Salomaa | G06F 9/451 |
| | | | | 715/700 |
| 2007/0021126 | A1* | 1/2007 | Nanda | H04W 48/16 |
| | | | | 455/456.1 |
| 2008/0009324 | A1* | 1/2008 | Patel | H04B 17/318 |
| | | | | 455/566 |
| 2009/0111526 | A1* | 4/2009 | Masri | H04M 1/72519 |
| | | | | 455/566 |
| 2009/0170554 | A1* | 7/2009 | Want | H04W 84/22 |
| | | | | 455/552.1 |
| 2010/0027525 | A1* | 2/2010 | Zhu | H04W 48/16 |
| | | | | 370/350 |
| 2010/0083121 | A1 | 4/2010 | Famolari et al. | |
| 2010/0099405 | A1 | 4/2010 | Brisebois et al. | |
| 2012/0108225 | A1 | 5/2012 | Luna et al. | |
| 2012/0131184 | A1 | 5/2012 | Luna et al. | |
| 2013/0325326 | A1* | 12/2013 | Blumenberg | G01C 21/36 |
| | | | | 701/428 |
| 2014/0171065 | A1 | 6/2014 | Graessley | |
| 2014/0200050 | A1* | 7/2014 | Tomek | H04B 17/23 |
| | | | | 455/566 |
| 2015/0016406 | A1 | 1/2015 | Holostov et al. | |
| 2015/0023161 | A1 | 1/2015 | Alisawi et al. | |
| 2016/0360461 | A1 | 12/2016 | Travostino et al. | |
| 2017/0078922 | A1 | 3/2017 | Raleigh et al. | |
| 2017/0123390 | A1* | 5/2017 | Barco | H02J 13/00 |
| 2020/0374147 | A1 | 11/2020 | Ogawa et al. | |

FOREIGN PATENT DOCUMENTS

| | | |
|---|---|---|
| JP | 2013-229915 A | 11/2013 |
| JP | 2016-063520 A | 4/2016 |
| JP | 2016-184817 A | 10/2016 |

OTHER PUBLICATIONS

International Search Report and Written Opinion dated Apr. 23, 2019 in International Application No. PCT/JP2019/007575; with partial English translation.
Non-Final Office Action issued in U.S. Appl. No. 16/638,721, dated Feb. 4, 2021.
Extended European Search Report issued in European Patent Application No. 19764137.6, dated Mar. 12, 2021.
Extended European Search Report issued in European Patent Application No. 19764400.8 dated Mar. 16, 2021.
Xia, N. et al. "Radio Resource Management in Machine-to-Machine Communications-A Survey," IEEE Communications Surveys & Turorials, Oct. 23, 2018, vol. 20, No. 1, First Quarter 2018, pp. 791-828; XP011678442.
Anonymous, "Airplane Mode Wi-Fi Enabler: XDA Developers Forums," Sep. 20, 2009, XP055781491; 6 pages; available at URL:https://forum.xda-developers.com/t/airplane-mode-wi-fi-enabler.549613/.

* cited by examiner

DEVICE AND METHOD

CROSS-REFERENCE OF RELATED APPLICATIONS

This application is the U.S. National Phase under 35 U.S.C. § 371 of International Patent Application No. PCT/JP2019/007577, filed on Feb. 27, 2019, which in turn claims the benefit of U.S. Provisional Application No. 62/640,758, filed on Mar. 9, 2018, the entire disclosures of which Applications are incorporated by reference herein.

TECHNICAL FIELD

The present disclosure relates to a device and a method.

BACKGROUND ART

In recent years, there is a configuration in which a household appliance (also referred to as a device) is connected via a network to an appliance control cloud (also referred to as control cloud) that is a cloud for controlling the device, and operates under control of the control cloud (see Patent Literature (PTL) 1).

However, there are products including a plurality of wireless communication modules (also simply referred to as communication modules) among information modules such as cellular phones and smartphones.

CITATION LIST

Patent Literature

Japanese Unexamined Patent Application Publication No. 2016-63520

SUMMARY OF THE INVENTION

Technical Problems

When a device includes a plurality of communication modules, it is difficult for a user to know which communication module is suitable for the device to use to communicate, by simply lining up and displaying a signal strength of each communication module. When the user cannot select the appropriate communication module, there is the problem of signal transmission taking longer and power consumption increasing more than when the appropriate communication module is selected.

Accordingly, the present disclosure provides a device and the like that is capable of displaying a wireless communication module suitable for communication from among a plurality of wireless communication modules.

Solution to Problems

A device according to the present disclosure includes: N (N≥2) communication modules that perform wireless communicate at different communication speeds; a selector that selects, from the N communication modules, one communication module to be used for the wireless communication by the device; an obtainer that obtains a reception strength of a signal received by the one communication module from a base station; a generator that generates an image that includes at least 2N display regions arranged from a reference position in one direction, the at least 2N display regions being associated with the N communication modules in order of communication speed from slower to faster per at least two display regions counted from the reference position along the one direction; and a display that displays the image generated by the generator. The generator generates, as the image, an image displaying: (a) a graphic of a first type in, among the at least two display regions associated with the one communication module, more display regions counted from proximity to the reference position along the one direction, with an increase in the reception strength of the one communication module; and (b) the graphic of the first type in each of at least two display regions associated with a communication module that communicates at a slower speed than the one communication module.

This enables the device to display in a configuration in which it is possible for a user to intuitively understand the communication speeds of a plurality of communication modules, and display an image indicating a reception strength of the communication module that the device is currently using to perform wireless communication. In this image, since multiple graphics (graphics of a first type) are displayed in parallel, it is possible for the user to recognize these multiple graphics as one set of graphics. The user sees the set of graphics displayed on the device, and is capable of intuitively understanding the communication speeds of the plurality of communication modules and the communication module currently in use, based on the graphics that the user is seeing. In this manner, the device is capable of displaying a wireless communication module suitable for communication from among the plurality of wireless communication modules. Thus, when an appropriate communication module is selected based on an operation and the like by the user, it is possible to produce the advantageous effects of reducing signal transmission time and power consumption.

The generator may preassociate each of the at least 2N display regions with dimensions increasing along the one direction, store the dimensions as dimensions of a graphic displayed in a corresponding one of the at least 2N display regions, and may generate, as the image, an image in which each of at least one of the graphic of the first type included in the image includes the dimensions that are preassociated with the at least 2N display regions displaying the graphic of the first type.

With this, the device displays the communication speed through the at least one graphic having larger dimensions as the communication modules have faster communication speed. The user is capable of naturally recognizing that a graphic with larger dimensions indicates a communication module with a faster communication speed. In this manner, the device is capable of displaying a wireless communication module suitable for communication from among the plurality of wireless communication modules.

The generator may generate, as the image, an image displaying a graphic of a second type in, among the at least 2N display regions, a display region not displaying the graphic of the first type.

With this, the device displays an image displaying either one of the graphic of the first type or the graphic of the second type in at least 2N display regions. The user is capable of more easily recognizing the displayed image as the set of graphics, regardless of which communication module is currently in use or a reception strength of the communication module currently in use. In this manner, the device is capable of displaying a wireless communication module suitable for communication from among the plurality of wireless communication modules.

The generator may generate, as the image, an image displaying: characters respectively related to the N communication modules, the characters each displayed in a vicinity of a display region associated with a corresponding one of the N communication modules; and one of the characters related to the one communication module in another configuration than one of the characters related to an other communication module among the N communication modules.

With this, the device displays information relating to a communication module, e.g. a name of the communication module currently in use, in a different configuration than information relating to another communication module. This enables the user to easily recognize the information related to the communication modules from the graphics displayed by the device. In this manner, the device is capable of displaying a wireless communication module suitable for communication from among the plurality of wireless communication modules.

The generator may generate, as the image, an image displaying the character indicating a name of the one communication module with a darker color than the character indicating a name of the other communication module among the N communication modules.

With this, the device displays the name of the communication module currently in use in a different configuration than the name of the other communication module. This enables the user to differentiate and more easily recognize the communication module currently being used by the device from other communication modules. In this manner, the device is capable of displaying a wireless communication module suitable for communication from among the plurality of wireless communication modules.

A control method according to the present disclosure to be executed by a device that includes N (N≥2) communication modules that perform wireless communication at different communication speeds includes: selecting, from the N communication modules, one communication module to be used for the wireless communication by the device; obtaining a reception strength of a signal received by the one communication module from a base station; generating an image that includes at least 2N display regions arranged from a reference position in one direction, the at least 2N display regions being associated with the N communication modules in order of communication speed from slow to fast per at least two display regions counted from the reference position along the one direction; and displaying the image generated in the generating. In the generating, as the image: (a) a graphic is displayed in, among the at least two display regions associated with the one communication module, more display regions counted from proximity to the reference position along the one direction, with an increase in the reception strength of the one communication module; and (b) the graphic is displayed in each of at least two display regions associated with a communication module that communicates at a slower speed than the one communication module.

This produces the same advantageous effect as the above device.

Advantageous Effect of Invention

A device according to the present disclosure is capable of displaying a wireless communication module suitable for communication from among a plurality of wireless communication modules.

DESCRIPTION OF EXEMPLARY EMBODIMENT

Hereinafter, an embodiment will be described in detail with reference to the drawings where required. However, unnecessarily detailed descriptions may be omitted. For example, detailed descriptions of well-known matters or descriptions of components that are substantially the same as components described previous thereto may be omitted. This is to avoid redundancy and facilitate understanding of the descriptions for those skilled in the art.

Note that the inventor(s) have provided the accompanying drawings and subsequent descriptions to facilitate sufficient understanding of the present disclosure by those skilled in the art, and are thus not intended to limit the scope of the subject matter recited in the claims.

Embodiment

In the present embodiment, a device that is capable of displaying a wireless communication module suitable for communication from among a plurality of wireless communication modules will be described.

Figure 1:
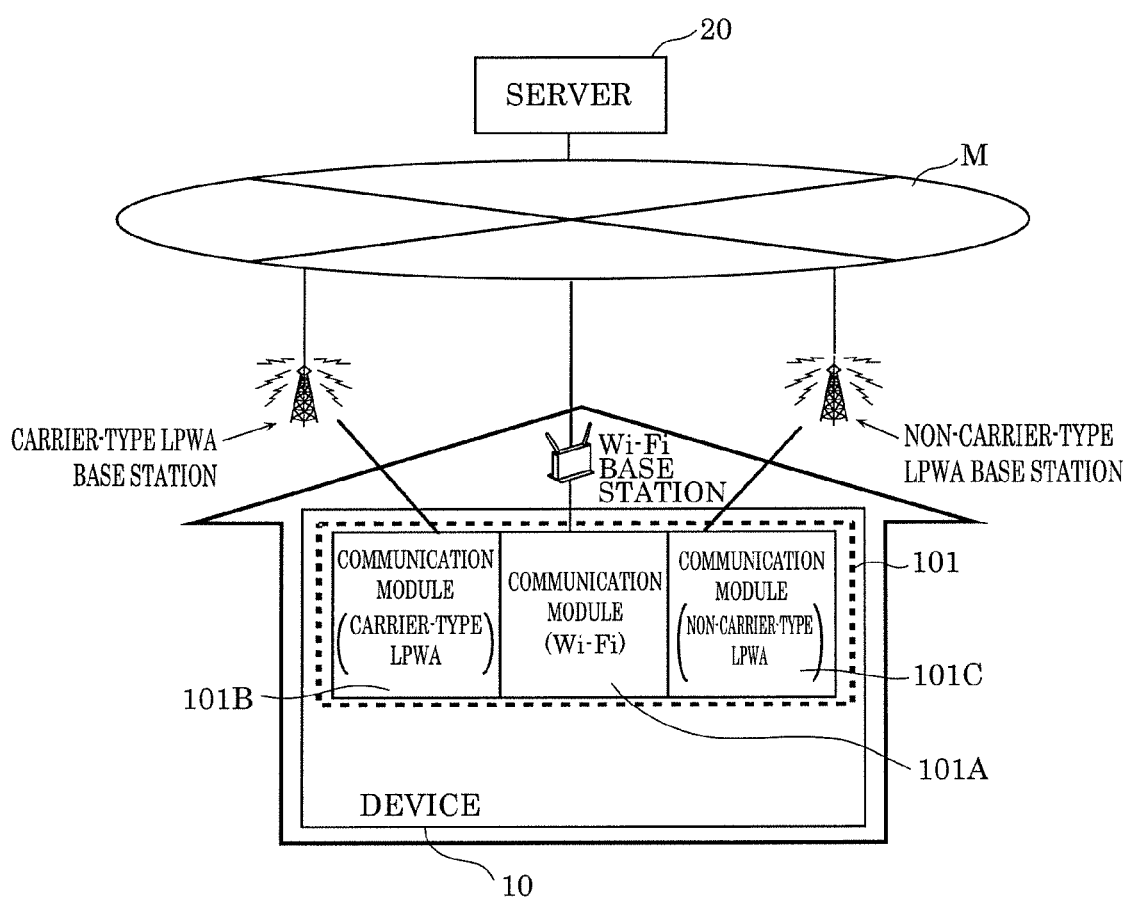
FIG. 1 is an explanatory diagram showing a communication system that includes a device including a plurality of wireless communication modules.

FIG. 1 is an explanatory diagram showing a communication system that includes device 10 including the plurality of wireless communication modules.

The communication system shown in FIG. 1 includes device 10, and server 20 that controls device 10. Device 10 is capable of communication with server 20 via network M. Device 10 receives a communication packet from the server via network M and operates by being controlled according to control information included in the received communication packet.

Device 10 includes three communication modules as the plurality of communication modules. Note that the plurality of communication modules may also be two or more communication modules.

The three communication modules included in device 10 are, for example, a Wi-Fi communication Module®, a carrier-type low-power wide-area (LPWA) communication module, and a non-carrier-type LPWA communication module, and are each described as an example, but are not limited thereto. Communication speeds and communication bands of these communication modules increase in the order of non-carrier-type LPWA, carrier-type LPWA, and Wi-Fi.

The Wi-Fi communication module is connected to a Wi-Fi base station, and is connected to server 20 via the Wi-Fi base station and an access network of a communications service provider. The access network of the communications service provider is included in network M. Note that in the drawing, a Wi-Fi access point (AP) is disposed inside a house, but may also be disposed outside of the house.

The carrier-type LPWA communication module is connected to a carrier-type LPWA base station, and is connected to server 20 via the carrier-type LPWA base station and an access network of a carrier. The access network of the carrier is included in network M.

The non-carrier-type LPWA communication module is connected to a non-carrier-type LPWA base station, and is connected to server 20 via the non-carrier-type LPWA base station and an access network of an operator that provides the non-carrier-type LPWA base station. The access network of the above operator is included in network M.

Figure 2:
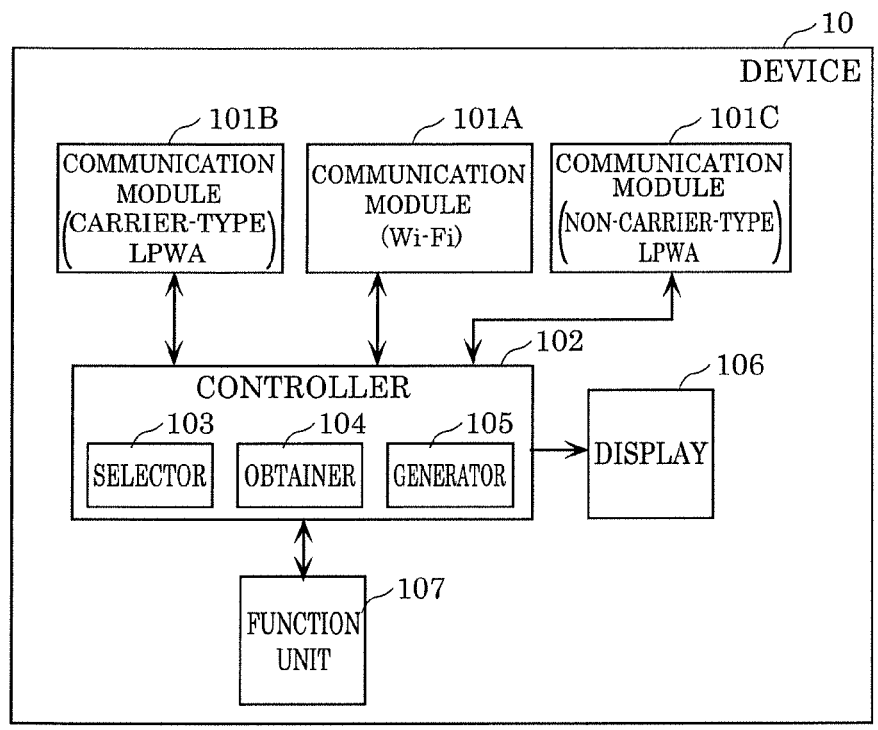
FIG. 2 is a block diagram showing functions of the device according to an embodiment.

FIG. 2 is a block diagram showing functions of device 10 according to the present embodiment.

As illustrated in FIG. 2, device 10 includes a plurality of communication modules 101A, 101B, and 101C; controller 102; display 106; and function unit 107.

The plurality of communication modules 101A, 101B, and 101C (also referred to as communication modules 101A, etc.) are each a communication module capable of being communicably connected to server 20 via network M. An example is described here as the plurality of communication modules being three communication modules, but a total number of the communication modules is not limited thereto, and may also be two or more. The total number of the communication modules is also referred to as N (however, N is an integer of 2 or more). The plurality of communication modules 101A, 101B, and 101C are respectively the Wi-Fi communication module, the carrier-type LPWA, and the non-carrier-type LPWA communication module.

Controller 102 is a processor that generates an image indicating a reception strength of a signal (generally also referred to as signal strength) received by communication modules 101A, etc. from a base station. A process performed by controller 102 can be implemented by a processor executing a predetermined computer program.

Controller 102 includes selector 103, obtainer 104, and generator 105 as subcomponents.

Selector 103 selects, from the N communication modules, one communication module to be used for the wireless communication by device 10. In principle, device 10 communicates with server 20 using the one communication module among the N communication modules. For the one communication module used by device 10 to communicate with server 20, a communication channel with, for example, comparatively high communication quality or a comparatively high communication band is selected, the communication channel extending from the one communication module to server 20. Note that a method for selecting the one communication module from the N communication modules can be various selection methods based on the communication quality and the communication band. This selection method can be adopted from known techniques.

Obtainer 104 obtains the reception strength of the signal received by the one communication module selected by selector 103 from a base station. Note that obtainer 104 may, in the above obtaining, obtain the reception strengths of two or more communication modules including the one communication module, and may also obtain all the reception strengths of the plurality of communication modules 101A, etc.

Generator 105 generates the image illustrating the reception strength. To be specific, generator 105 generates an image that includes at least 2N display regions arranged from a reference position in one direction, the at least 2N display regions being associated with the N communication modules in order of communication speed from slow to fast per at least two display regions counted from the reference position along the one direction. Generator 105 generates, as the above image, an image displaying (a) a graphic of a first type in, among the at least two display regions associated with the one communication module, more display regions counted from proximity to the reference position along the one direction, with an increase in the reception strength of the one communication module, and (b) the graphic of the first type in each of at least two display regions associated with a communication module that communicates at a slower speed than the one communication module. Graphic of a first type here means the presence of reception strength to be illustrated in a position in which the graphic of the first type is displayed. Note that the above "display regions", "reference position", and "one direction" may actually be displayed in the image, but may also not be displayed.

Generator 105 may generate, as the above image, an image displaying a graphic of a second type in, among the at least 2N display regions, a display region not displaying the graphic of the first type. Graphic of a second type here means the lack of reception strength to be illustrated in a position in which the graphic of the second type is displayed. Note that displaying the graphic of the second type is not essential.

The graphic of the first type and the graphic of the second type may be any type of graphic as long as their configurations are different. For example, the graphic of the first type may be a polygon that is colored in and the graphic of the second type may be a polygon that is not colored in. For example, the graphic of the first type may be a polygon that is colored in with a comparatively dark color and the graphic of the second type may be a polygon that is colored in a comparatively light color. For example, the graphic of the first type may be a polygon with solid lines and the graphic of the second type may be a polygon with dashed or dotted lines.

Generator 105 generates an image showing various information regarding an operation of function unit 107. The above image includes an image showing an operation state of function unit 107, an image of an icon for receiving settings or an instruction with respect to function unit 107 from a user, or the like.

Display 106 is a processor that displays the image generated by generator 105 on a display screen. The display screen is explained as an example when being included in device 10, but may also be included in a device different from device 10.

Display 106 obtains the image generated by generator 105 and displays the image by displaying pixels forming this image on the display screen. When display 106 displays the image on a display screen included in another device, display 106 transmits the image to the other device and causes it to be displayed through communication.

Function unit 107 is a module that produces the functionality of device 10. For example, when device 10 is a refrigerator, function unit 107 is a module that produces cooling, and to be more specific, includes a cooling module, a fan, and the like.

Figure 3:
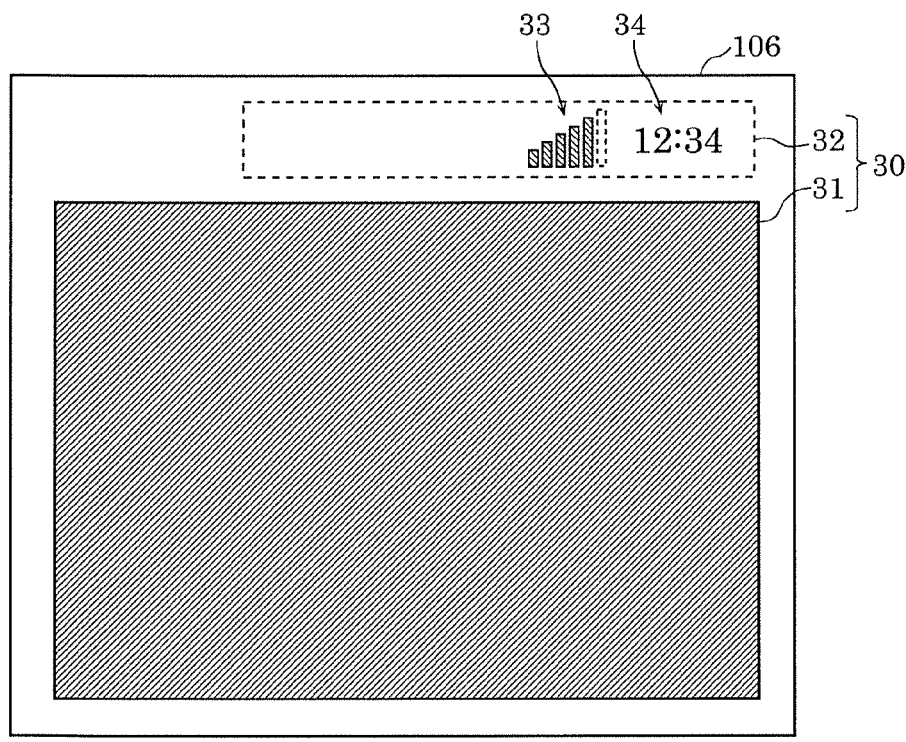
FIG. 3 is an explanatory diagram showing an example of an image displayed by the device according to the embodiment.

FIG. 3 is an explanatory diagram showing an example of image 30 displayed by device according to the present embodiment.

Image 30 shown in FIG. 3 includes main image 31 and status image 32.

Main image 31 shows various information regarding the operation of function unit 107.

Status image 32 shows a status and the like of device 10. Status image 32 includes image 33 showing the reception strengths of the plurality of communication modules. Note that status image 32 may include, in addition to the above, image 34 showing a current time, an image showing remaining battery capacity (not illustrated) when device 10 includes a battery, and the like.

Hereinafter, image 33 will be described in detail.

Figure 4:
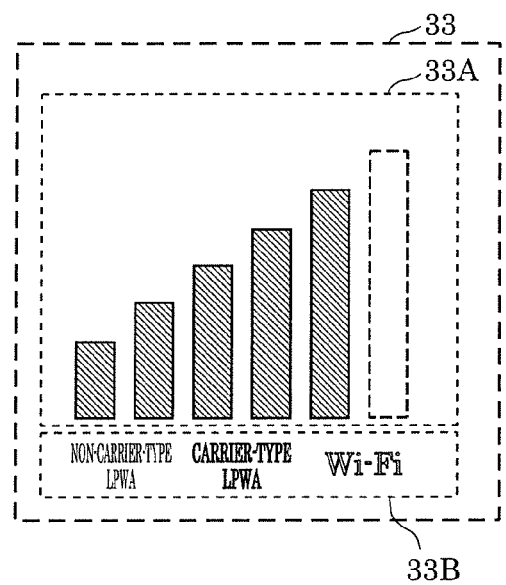
FIG. 4 is an explanatory diagram showing a first example of an image that indicates a reception strength and is displayed by the device according to the embodiment.

FIG. 4 is an explanatory diagram showing a first example of image 33 that indicates a reception strength and is displayed by device 10 according to the present embodiment. Image 33 shown in FIG. 4 is an example of the image generated by generator 105 and displayed by display 106, and shows the reception strength of each of the three communication modules 101A, etc.

As illustrated in FIG. 4, image 33 shows the reception strengths of the three communication modules 101A, etc. as a set of graphics. The set of graphics are graphics that can be recognized as one set of graphics when a person sees the graphics, and adjacent graphics are, for example, separated by a certain gap to some extent.

Image 33A, which is included in image 33 and includes six bars in parallel, shows an indication of the communication speeds of the communication modules. Note that the bars correspond to the above graphics. Note that it is possible to use a graphic of choice instead of the rectangular bars shown in FIG. 4. To be specific, a polygon of choice or a circular graphic may also be used.

Each bar is associated with a corresponding one of the three communication modules. To be specific, the bars are associated with the communication speeds of the communication modules in an order from slower to faster from left to right.

For example, the first and second bars from the left are associated with non-carrier-type LPWA. The third and fourth bars from the left are associated with carrier-type LPWA. The fifth and sixth bars from the left are associated with Wi-Fi.

This enables device 10 to indicate that the communication speeds of non-carrier-type LPWA, carrier-type LPWA, and Wi-Fi increase in this order. More specifically, a fast communication speed can be obtained by connecting to Wi-Fi, which makes it possible to indicate that the user can use device 10 without problem.

Image 33B including characters related to the communication modules is displayed in a vicinity of the bars. Device 10 is capable of illustrating various matter through image 33B.

For example, device 10 is capable of illustrating which communication module is currently being used in the communication by device 10 through image 33B. To be specific, device 10 is capable of using characters indicating the communication methods of the communication modules as the characters related to the communication modules. In this case, one of the characters related to the communication module currently in use is displayed in another configuration than one of the characters related to another communication module.

More specifically, the character related to the communication method of the communication module implementing the current communication speed, i.e., the communication module currently in use by device 10, is displayed with a comparatively dark color, and the character related to the communication modules currently not in use are displayed with a comparatively light color (e.g. outlined in white or thinned out). This makes it possible to illustrate which communication method is selected as the communication method currently being used by device 10 (e.g. Wi-Fi or carrier-type LPWA).

Figure 7:
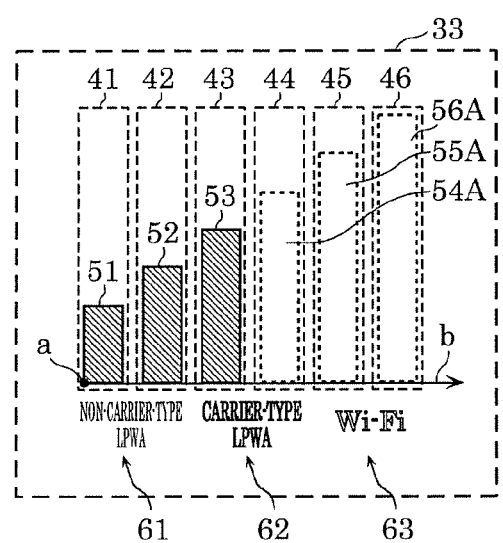
FIG. 7 is an explanatory diagram showing a fourth example of the image that indicates the reception strength and is displayed by the device according to the embodiment.
Figure 8:
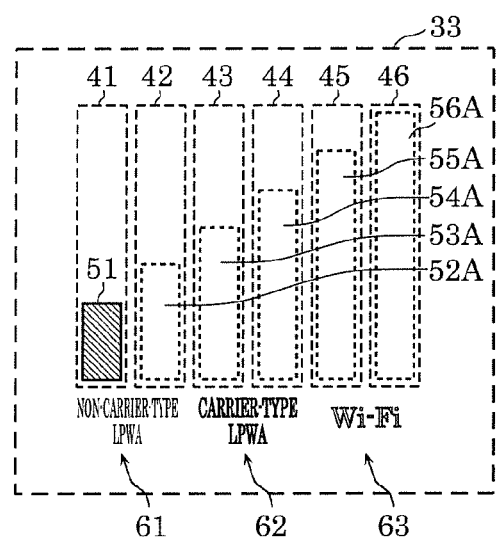
FIG. 8 is an explanatory diagram showing the fourth example of the image that indicates the reception strength and is displayed by the device according to the embodiment.

Hereinafter, image 33 will be described in more detail with reference to FIGS. 5-8. Image 33 shown in FIG. 5, FIG. 7, and FIG. 8 is an example of the image generated by generator 105 and displayed by display 106, and shows the reception strength of each of the three communication modules 101A, etc.

Figure 5:
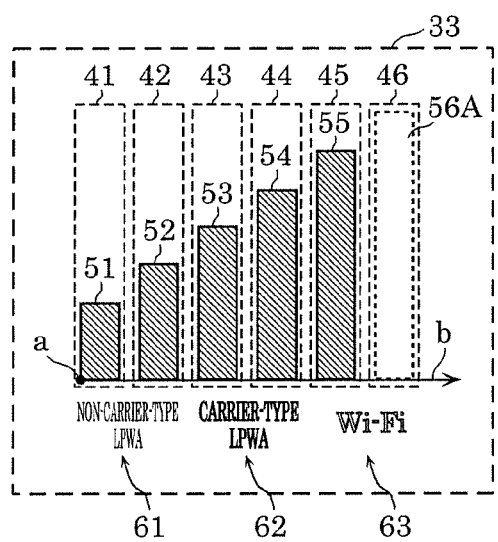
FIG. 5 is an explanatory diagram showing a second example of the image that indicates the reception strength and is displayed by the device according to the embodiment.
Figure 6:
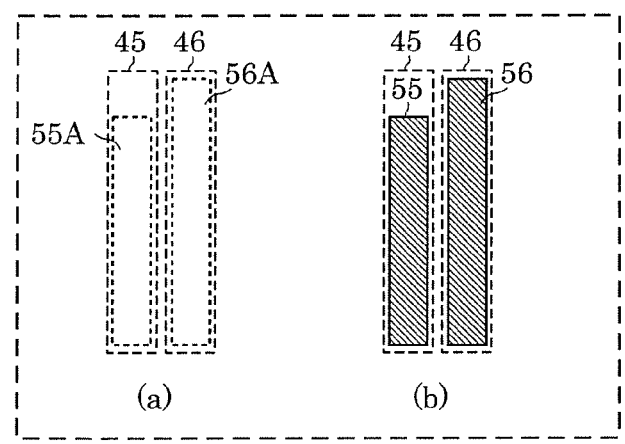
FIG. 6 is an explanatory diagram showing a third example of the image that indicates the reception strength and is displayed by the device according to the embodiment.

FIG. 5 and FIG. 6 are explanatory diagrams showing respectively a second example and a third example of the image that indicates the reception strength and is displayed by device 10 according to the present embodiment. FIG. 6 is a diagram showing only display regions 45 and 46 in FIG. 5.

FIG. 5 shows image 33 including five bars 51, 52, 53, 54, and 55 each corresponding to the graphic of the first type; and one bar 56A corresponding to the graphic of the second type. In FIG. 5, region including positions in which bars 51, etc. are displayed are respectively shown as display regions 41, 42, 43, 44, 45, and 46. FIG. 5 also shows reference position a and one direction b. Note that reference position a and one direction b may actually be illustrated as images, but may also not be illustrated.

Dimensions of each of the six bars are predetermined, and increase from left to right. At this point, the right direction (right orientation) corresponds to the "one direction". Device 10 preassociates each of display regions 41, etc. with the dimensions of the bar displayed in a corresponding display region, and stores the dimensions. Generator 105 generated image 33 in which each of the bars included in image 33 has the dimensions preassociated with a corresponding bar.

As illustrated in FIG. 5, when, for example, the Wi-Fi communication module 101A of device 10 is connected to the Wi-Fi base station, the signal strength, i.e., the reception strength of the Wi-Fi, is presented with the fifth and sixth bars from the left (bars 55 and 56A) (see FIG. 6). As illustrated in (a) of FIG. 6, when the signal strength is comparatively poor, i.e., when the reception strength is comparatively low, bars 55A and 56A, which are graphics of the second type, are displayed in display regions 45 and 46. As illustrated in (b) of FIG. 6, when the signal strength is comparatively good, i.e., when the reception strength is comparatively high, bars 55 and 56, which are graphics of the first type, are displayed in display regions 45 and 46. As illustrated in FIG. 5, when the signal strength is midrange, bar 55 is displayed in display region 45 and bar 56A is displayed in display region 46, bar 55 being the graphic of the second type and bar 56A being the graphic of the second type.

At this point, the first to fourth bars from the left (bars 51-54) are graphics of the first type, to be specific, are displayed as colored in graphics, regardless of the connection states of the carrier-type LPWA and the non-carrier-type LPWA.

Character 63 indicating the Wi-Fi communication module currently being used for the communication is displayed with a comparatively dark color, and characters 61 and 62 indicating the carrier-type LPWA and non-carrier-type LPWA communication modules are displayed with a comparatively light color. This makes it possible to indicate that Wi-Fi is selected as the communication method currently being used by device 10.

FIG. 7 shows image 33 including the three bars 51, 52, and 53 each corresponding to the graphic of the first type; and three bars 54A, 55A, and 56A each corresponding to the graphic of the second type.

As illustrated in FIG. 7, when, for example, the carrier-type LPWA communication module 101B of device 10 is connected to the carrier-type LPWA base station, the signal strength of the carrier-type LPWA is presented with the third and fourth bars from the left (bars 53 and 54A). The presentation method of the signal strength is the same as in FIG. 6. At this point, the first and second bars from the left (bars 51 and 52) are graphics of the first type, to be specific, are displayed as colored in graphics, regardless of the connection state of the non-carrier-type LPWA. The fifth and sixth bars (bars 55A and 56A) are graphics of the second type, to be specific, are displayed graphics illustrated with dashed lines.

Character 62 indicating the carrier-type LPWA communication module currently being used for the communication is displayed with a comparatively dark color, and characters 61 and 63 indicating the Wi-Fi and non-carrier-type LPWA communication modules are displayed with a comparatively light color. This makes it possible to indicate that carrier-type LPWA is selected as the communication method currently being used by device 10.

FIG. 8 shows image 33 including the one bar 51 corresponding to the graphic of the first type; and five bars 52A, 53A, 54A, 55A, and 56A each corresponding to the graphic of the second type.

As illustrated in FIG. 8, in a case in which only non-carrier-type LPWA is connected, the signal strength of the non-carrier-type LPWA is presented with the first and second bars from the left (bars 51 and 52A). The presentation method of the signal strength is the same as in FIG. 6. At this point, the third to sixth bars from the left (bars 53A-56A) are graphics of the second type, to be specific, are graphics illustrated with dashed lines, regardless of the connection state of the Wi-Fi.

Character 61 indicating the non-carrier-type LPWA communication module currently being used for the communication is displayed with a comparatively dark color, and characters 62 and 63 indicating the carrier-type LPWA and Wi-Fi communication modules are displayed with a comparatively light color. This makes it possible to indicate that non-carrier-type LPWA is selected as the communication method currently being used by device 10.

Through such a display method, it is possible, for example, to let the user know that switching to Wi-Fi will speed up the communication speed, when the IoT appliance is connected through non-carrier-type LPWA or carrier-type LPWA and the user feels response time is slow when performing a type of operation.

Figure 9:
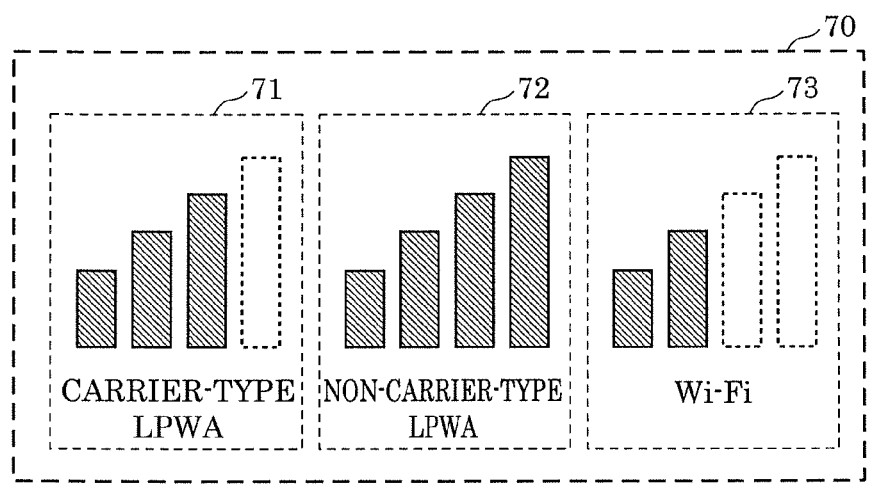
FIG. 9 is an explanatory diagram showing an image that indicates reception strengths and is displayed by a device according to a comparative example.

FIG. 9 is an explanatory diagram showing image 70 that indicates reception strengths and is displayed by a device according to a comparative example.

Image 70 shown in FIG. 9 is not the image showing the set of graphics shown in FIG. 4 to FIG. 8, but is an example displaying images in parallel that indicate the reception strength of each communication module.

As illustrated in FIG. 9, when image 70 is displayed in which image 71 indicating the reception strength of the carrier-type LPWA, image 72 indicating the reception strength of the non-carrier-type LPWA, and image 73 indicating the reception strength of the Wi-Fi are lined up, it is difficult for a standard user to know what communication speed to expect.

For example, a signal strength of the non-carrier-type LPWA is exceedingly good in FIG. 9. Thus, from the point of view of the user that does not know the characteristics of each communication method, it is possible that the user may falsely make the assumption that high communication speed is possible, i.e., that all functionality of the IoT appliance can be used without problem, by using non-carrier-type LPWA.

In other words, to the user, the communication speed of the Wi-Fi ends up appearing the slowest and the communication speed of the non-carrier-type LPWA the fastest. In this manner, it is difficult for the user to know which communication module has fast communication speed.

In contrast, with the image displayed by device 10 according to the present embodiment (see FIG. 4 to FIG. 8), the user is capable of knowing the reception strength of the communication method currently in use, while also intuitively understanding what communication speed can be expected from each communication method. In this manner, device 10 is capable of displaying a wireless communication module suitable for communication from among the plurality of wireless communication modules.

Figure 10:
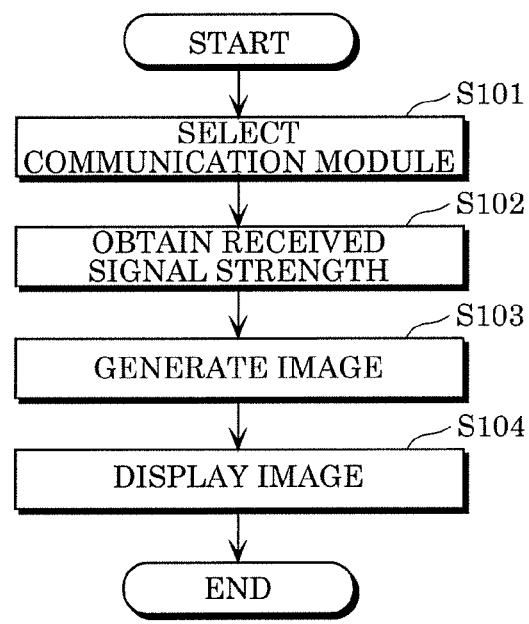
FIG. 10 is a flowchart showing a process executed by the device according to the present embodiment.

FIG. 10 is a flowchart showing a process executed by device 10 according to the present embodiment.

As illustrated in FIG. 10, in step S101 (selecting), device 10 selects, from the N communication modules, one communication module to be used for the wireless communication by device 10.

In step S102 (obtaining), device 10 obtains a reception strength of a signal received by the one communication module from a base station.

In step S103 (generating), device 10 generates an image that includes at least 2N display regions arranged from a reference position in one direction, the at least 2N display regions being associated with the N communication modules in order of communication speed from slow to fast per at least two display regions counted from the reference position along the one direction. Device 10 generates, as the above image, an image displaying (a) a graphic in, among the at least two display regions associated with the one communication module, more display regions counted from proximity to the reference position along the one direction, with an increase in the reception strength of the one communication module, and (b) the graphic in each of at least two display regions associated with a communication module that communicates at a slower speed than the one communication module.

In step S104 (displaying), device 10 displays the image generated in the generating.

This enables device 10 to display a wireless communication module suitable for communication from among the plurality of wireless communication modules.

As stated above, the embodiment is described as an example of the technique in the present disclosure. Accordingly, accompanying drawings and detailed description are provided.

Therefore, the components described in the accompanying drawings and the detailed description include, in addition to components essential to overcoming problems, components that are not essential to overcoming problems but are included in order to exemplify the techniques described above. Thus, those non-essential components should not be deemed essential due to the mere fact that they are illustrated in the accompanying drawings and described in the detailed description.

The above embodiment is for providing an example of the technique in the present disclosure, and thus various modifications, substitutions, additions, and omissions are possible in the scope of the claims and equivalent scopes thereof.

INDUSTRIAL APPLICABILITY

The present disclosure can be applied to a device including a plurality of communication modules. To be specific, the present disclosure can be applied to appliances such as a refrigerator, communication devices, or the like.

The invention claimed is:

1. A device, comprising:
N communication circuits that perform wireless communication at different communication speeds, where N >2;
a selector that selects, from the N communication circuits, one communication circuit used for the wireless communication by the device;
an obtainer that obtains a reception strength of a signal received by the one communication circuit from a base station;
a generator that generates an image that includes at least 2N display regions arranged from a reference position in one direction, each of the at least 2N display regions being associated only with a corresponding one of the N communication circuits, in order of communication speed from slower to faster per at least two display regions counted from the reference position along the one direction, wherein a same number of display regions of the at least 2N display regions is associated with each of the N communication circuits; and
a display that displays the image generated by the generator, wherein
the generator generates, as the image, an image displaying:
  (a) a graphic of a first type in, among the at least two display regions associated with the one communication circuit, more display regions counted from proximity to the reference position along the one direction, with an increase in the reception strength of the one communication circuit; and
  (b) the graphic of the first type in each of at least two display regions associated with a communication circuit that communicates at a slower speed than the one communication circuit.

2. The device according to claim 1, wherein
the generator:
preassociates each of the at least 2N display regions with dimensions increasing along the one direction, and stores the dimensions as dimensions of a graphic displayed in a corresponding one of the at least 2N display regions; and
generates, as the image, an image in which each of at least one of the graphic of the first type included in the image has the dimensions that are preassociated with the at least 2N display regions displaying the graphic of the first type.

3. The device according to claim 1, wherein
the generator generates, as the image,
an image displaying a graphic of a second type in, among the at least 2N display regions, a display region not displaying the graphic of the first type.

4. The device according to claim 1, wherein
the generator generates, as the image, an image displaying:
  characters respectively related to the N communication circuits, the characters each being displayed in a vicinity of a display region associated with a corresponding one of the N communication circuits; and
  one of the characters related to the one communication circuit in another configuration than one of the characters related to an other communication circuit among the N communication circuits.

5. The device according to claim 4, wherein
the generator generates, as the image,
an image displaying the one of the characters indicating a name of the one communication circuit with a darker color than the one of the characters indicating a name of the other communication circuit among the N communication circuits.

6. A method executed by a device that includes N communication circuits that perform wireless communication at different communication speeds, where N 2, the method comprising:
selecting, from the N communication circuits, one communication circuit to be used for the wireless communication by the device;
obtaining a reception strength of a signal received by the one communication circuit from a base station;
generating an image that includes at least 2N display regions arranged from a reference position in one direction, each of the at least 2N display regions being associated only with a corresponding one of the N communication circuits, in order of communication speed from slow to fast per at least two display regions counted from the reference position along the one direction, wherein a same number of display regions of the at least 2N display regions is associated with each of the N communication circuits; and
displaying the image generated in the generating, wherein
in the generating, as the image:
  (a) a graphic is displayed in, among the at least two display regions associated with the one communication circuit, more display regions counted from proximity to the reference position along the one direction, with an increase in the reception strength of the one communication circuit; and
  (b) the graphic is displayed in each of at least two display regions associated with a communication circuit that communicates at a slower speed than the one communication circuit.

* * * * *